J. W. MAST.
SNAP HOOK.
APPLICATION FILED JAN. 27, 1911.
1,005,257.
Patented Oct. 10, 1911.
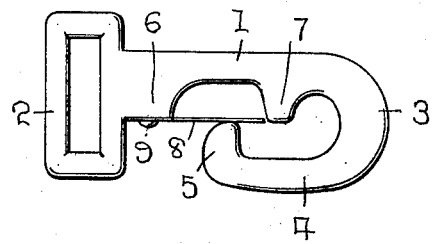
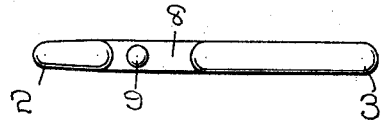
WITNESSES:
INVENTOR
J. W. Mast
BY
Attorneys

UNITED STATES PATENT OFFICE.

JOHN WILLIAM MAST, OF LITTLE ROCK, ARKANSAS.

SNAP-HOOK.

1,005,257.     Specification of Letters Patent.     Patented Oct. 10, 1911.

Application filed January 27, 1911. Serial No. 605,109.

*To all whom it may concern:*

Be it known that I, JOHN WILLIAM MAST, a citizen of the United States, residing at Little Rock, in the county of Pulaski and State of Arkansas, have invented certain new and useful Improvements in Snap-Hooks; and I do hereby declare the following to be a full, clear, and exact description of the invention, such as will enable others skilled in the art to which it appertains to make and use the same.

My invention relates to new and useful improvements in snap hooks, the object of the invention being to provide a simple, cheap and effective construction of hook having a spring closure mounted and constructed in a novel manner to facilitate the insertion and removal of the object to be held and to effectually prevent the casual disconnection of the same from the hook.

Other objects and advantages will be hereinafter more clearly set forth and pointed out in the claim.

In the accompanying drawing, I have shown the preferred embodiment of my invention.

In said drawing, Figure 1 is a side elevation of my improved hook, and, Fig. 2 is an edge view thereof.

Referring to the drawing in which similar reference numerals designate corresponding parts throughout the several views, 1 is the shank of my improved hook which is provided at one end with a loop 2, by means of which the hook may be attached to a suitable strap. The shank 1 is provided with a curved end portion 3, the portion of said shank beyond said curved end being turned back and extending substantially parallel to the shank 1, as shown at 4, approximately one-half the length thereof, the end of said shank being bent inward to form a stop 5, as hereinafter more clearly set forth. The shank 1 is provided with an enlarged portion 6 adjacent the loop 2 having a straight side and with an extension 7 adjacent the curved end portion 3, the straight side of the enlargement 6, and the extremities of the extension 7 and stop 5, being arranged substantially in line. A straight flat spring 8 is secured to the straight side of the enlargement 6 by means of a rivet 9 or otherwise, and extends in a straight line to a point adjacent the end of the extension 7, contacting with the end of the stop 5, the stationary end of the spring resting against the adjacent straight side of the loop 2, which side is at right angles to the straight side of the enlargement, thus preventing lateral movement of said spring. By this construction, it will be seen that the object to be engaged with the hook will have to be moved in a substantially S-shape path. The object is first forced against the spring 8 and moved beyond the stop 5 and then into engagement with the curved end 3 of the hook, and the extension 7 will effectually prevent the object from casually coming into engagement with the spring, thus protecting the spring from injury. When it is desired to disengage the object from the hook, it is only necessary to move the object to a point between the extension 7 and the stop 5 and force the same against the spring and then move the object beyond the stop.

From the foregoing, it will be seen that I have provided a snap hook with which an object may be readily engaged and from which the object may be readily disconnected. It will also be seen that the spring retaining means will be protected from casual injury.

What I claim as new is:—

A snap hook comprising a shank carrying integral therewith a loop at one end having a straight side, said shank having an enlargement integral therewith and with the loop, said enlargement having a straight edge at a right angle to the straight side of the loop, said shank having a lug extending at a right angle therefrom and parallel with the enlargement forming a spring receiving recess therebetween, the end of the shank adjacent the lug and opposite to the loop carrying end being bent upon itself and carried backward toward the loop and parallel with the main portion of the shank, the extremity of the bent end being turned inwardly toward the main portion of the shank about midway the length of the spring receiving recess, said extremity being parallel with the straight edge of the loop and ending practically on a line with the straight edge of the enlargement and the end of the lug, a leaf spring secured upon the straight edge of the enlargement so that its stationary end fits against the straight side of the loop to prevent lateral movement of the spring while the main portion of said spring extends across the spring receiving recess and to the near side of the lug, said spring normally pressing against the extremity of the bent end of the shank, said spring being adapted to be forced into the spring receiving recess when engaging an object with the snap hook or disengaging it therefrom to allow the passage of the same past said extremity of the end of the shank, said lug being adapted to prevent an object engaged with said snap hook from becoming caught beneath the spring, and means for securing said spring upon the straight edge of said enlargement.

In testimony whereof I have signed my name to this specification in the presence of two subscribing witnesses.

JOHN WILLIAM MAST.

Witnesses:
FRANK J. COOK,
L. KOERE.

Copies of this patent may be obtained for five cents each, by addressing the "Commissioner of Patents, Washington, D. C."